United States Patent
Heerboth et al.

(10) Patent No.: US 9,807,206 B2
(45) Date of Patent: Oct. 31, 2017

(54) AGGREGATING PHYSICAL NETWORK INTERFACES FOR PEER-TO-PEER CONNECTIONS

(71) Applicant: Apple Inc., Cupertino, CA (US)

(72) Inventors: Peter N. Heerboth, San Jose, CA (US); Craig P. Dooley, Los Gatos, CA (US); Michael J. Giles, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 290 days.

(21) Appl. No.: 13/788,852

(22) Filed: Mar. 7, 2013

(65) Prior Publication Data

US 2014/0258397 A1  Sep. 11, 2014

(51) Int. Cl.
| | | |
|---|---|---|
| *H04L 29/06* | (2006.01) | |
| *H04L 29/08* | (2006.01) | |
| *H04L 12/24* | (2006.01) | |
| *H04W 76/02* | (2009.01) | |
| *H04L 12/12* | (2006.01) | |
| *H04W 76/04* | (2009.01) | |
| *H04W 84/18* | (2009.01) | |
| *H04W 8/22* | (2009.01) | |
| *H04W 36/14* | (2009.01) | |

(52) U.S. Cl.
CPC .............. *H04L 69/24* (2013.01); *H04L 12/12* (2013.01); *H04L 41/08* (2013.01); *H04L 41/0866* (2013.01); *H04L 67/104* (2013.01); *H04L 67/1061* (2013.01); *H04L 67/1068* (2013.01); *H04W 76/02* (2013.01); *H04W 76/043* (2013.01); *H04W 8/22* (2013.01); *H04W 36/14* (2013.01); *H04W 84/18* (2013.01)

(58) Field of Classification Search
CPC ... H04L 69/24; H04L 41/0843; H04L 67/104; H04L 67/1061; H04L 67/1068; H04L 41/08; H04L 41/0803; H04L 41/0866; H04L 41/0869; H04L 41/12; H04W 76/023; H04W 76/02; H04W 76/025; H04M 3/567
See application file for complete search history.

(56) References Cited

U.S. PATENT DOCUMENTS

| | | | | |
|---|---|---|---|---|
| 7,263,070 B1 * | 8/2007 | Delker et al. | ................. | 709/227 |
| 7,305,546 B1 * | 12/2007 | Miller | ................... | H04L 69/162 713/153 |
| 7,447,149 B1 * | 11/2008 | Beesley | ................. | H04L 45/22 370/217 |
| 7,558,862 B1 * | 7/2009 | Tyukasz et al. | .............. | 709/227 |

(Continued)

*Primary Examiner* — Ramy M Osman
(74) *Attorney, Agent, or Firm* — Sterne, Kessler, Goldstein & Fox, PLLC

(57) ABSTRACT

The disclosed embodiments provide a system that facilitates communication with a first electronic device from a second electronic device. During operation, the system establishes a peer-to-peer connection between the first electronic device and the second electronic device on a first physical network interface. Next, the system uses the peer-to-peer connection to obtain, on the second electronic device, a first set of network-interface capabilities for the first electronic device. Finally, the system switches the peer-to-peer connection to a second physical network interface based on at least one of the first set of network-interface capabilities and one or more characteristics associated with the peer-to-peer connection.

27 Claims, 5 Drawing Sheets

(56) References Cited

U.S. PATENT DOCUMENTS

| | | | | |
|---|---|---|---|---|
| 8,565,744 B2* | 10/2013 | Taaghol | .............. | H04W 36/04 370/329 |
| 8,744,348 B2* | 6/2014 | Fine | .............. | H04L 67/34 455/41.1 |
| 8,892,079 B1* | 11/2014 | Nace et al. | .............. | 455/414.2 |
| 2005/0286466 A1* | 12/2005 | Tagg | .............. | H04L 12/2856 370/329 |
| 2007/0195765 A1* | 8/2007 | Heissenbuttel | .............. | H04L 12/4641 370/389 |
| 2008/0166967 A1* | 7/2008 | McKillop | .............. | H04W 52/50 455/41.2 |
| 2009/0010247 A1* | 1/2009 | Stille | .............. | H04L 65/103 370/352 |
| 2010/0085975 A1* | 4/2010 | Wang | .............. | H04L 69/24 370/395.53 |
| 2010/0131950 A1* | 5/2010 | Yamada | .............. | H04L 67/1097 718/1 |
| 2011/0082940 A1* | 4/2011 | Montemurro et al. | .............. | 709/227 |
| 2012/0244814 A1* | 9/2012 | Okayasu | .............. | H04M 1/6066 455/41.3 |
| 2012/0290170 A1* | 11/2012 | Yague Martin | .............. | B64F 5/0045 701/33.2 |
| 2012/0307921 A1* | 12/2012 | Ulmer-Moll | .............. | H04B 3/542 375/259 |
| 2013/0055347 A1* | 2/2013 | Chawla | .............. | H04W 12/08 726/3 |
| 2013/0100807 A1* | 4/2013 | Bhanage | .............. | H04W 4/26 370/232 |
| 2013/0325711 A1* | 12/2013 | Geslin | .............. | 705/41 |
| 2014/0115576 A1* | 4/2014 | Kothari | .............. | G06F 9/45558 718/1 |
| 2014/0185623 A1* | 7/2014 | Yam | .............. | H04L 67/10 370/401 |
| 2014/0258397 A1* | 9/2014 | Heerboth et al. | .............. | 709/204 |
| 2014/0328296 A1* | 11/2014 | Chen et al. | .............. | 370/329 |

\* cited by examiner

AGGREGATING PHYSICAL NETWORK INTERFACES FOR PEER-TO-PEER CONNECTIONS

BACKGROUND

Field

The disclosed embodiments relate to peer-to-peer connections between electronic devices. More specifically, the disclosed embodiments relate to techniques for aggregating physical interfaces for peer-to-peer connections between the electronic devices.

Related Art

Recent improvements in computing power and wireless networking technology have significantly increased the capabilities of electronic devices. For example, laptop computers, tablet computers, portable media players, smartphones, and/or other modern electronic devices are typically equipped with WiFi capabilities that allow the electronic devices to stream audio and/or video, share desktops and/or user interfaces (UIs), and/or transfer files wirelessly among one another.

However, conventional wireless networking technology may require the use of preexisting access points, cellular radio towers, and/or other structured networks to connect electronic devices to each other and/or the Internet. As a result, network traffic between two electronic devices may be limited by the availability, bandwidth, and/or capabilities of structured network components used to transmit the network traffic.

On the other hand, modern electronic devices may be capable of forming wireless ad hoc networks that bypass the use of access points, cellular towers, and/or structured networks to transmit network traffic among nodes of the wireless ad hoc networks. Instead, the electronic devices may use the wireless ad hoc networks to communicate directly with one another, thereby increasing throughput and/or removing limitations associated with transmitting data through the access points and/or structured networks. Consequently, communication among electronic devices may be facilitated by mechanisms for enabling and facilitating the creation and use of wireless ad hoc networks by the electronic devices.

SUMMARY

The disclosed embodiments provide a system that facilitates communication with a first electronic device from a second electronic device. During operation, the system establishes a peer-to-peer connection between the first electronic device and the second electronic device on a first physical network interface. Next, the system uses the peer-to-peer connection to obtain, on the second electronic device, a first set of network-interface capabilities for the first electronic device. Finally, the system switches the peer-to-peer connection to a second physical network interface based on at least one of the first set of network-interface capabilities and one or more characteristics associated with the peer-to-peer connection.

In some embodiments, the system also provides, to the first electronic device, a second set of network-interface capabilities for the second electronic device. The system may additionally switch the peer-to-peer connection to the second physical network interface based on the second set of network-interface capabilities.

In some embodiments, the system also moves the peer-to-peer connection back to the first physical interface based on updates to at least one of the first set of network-interface capabilities and the one or more characteristics.

In some embodiments, using the first physical network interface to establish the peer-to-peer connection involves:
 (i) using a discovery protocol to enable discovery of the first or second electronic devices on the first physical network interface;
 (ii) establishing the peer-to-peer connection over the first physical network interface; and
 (iii) enabling data transfer over the first physical network interface by attaching the first physical network interface to a virtual network interface on the second electronic device.

In some embodiments, switching the peer-to-peer connection to the second physical network interface involves attaching the second physical network interface to the virtual network interface, and detaching the first physical network interface from the virtual network interface.

In some embodiments, the first set of network-interface capabilities is obtained using a side channel on the first physical network interface.

In some embodiments, the one or more characteristics associated with the peer-to-peer connection include at least one of:
 (i) a buffer utilization associated with the peer-to-peer connection;
 (ii) an amount of network traffic over the peer-to-peer connection;
 (iii) contention between the network traffic and other network traffic on the first or second electronic devices;
 (iv) a use of the peer-to-peer connection by the first and second electronic devices;
 (v) an amount of data transmitted over the peer-to-peer connection;
 (vi) a power consumption associated with the peer-to-peer connection; and
 (vii) a level of security associated with the peer-to-peer connection.

In some embodiments, the first set of network-interface capabilities includes at least one of:
 (i) a type of physical network interface;
 (ii) one or more available channels;
 (iii) a current channel;
 (iv) an availability to switch channels;
 (v) a current network; and
 (vi) a reachable network address.

In some embodiments, wherein the first and second physical network interfaces include at least one of a Bluetooth interface, a wireless interface, and an Ethernet interface.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
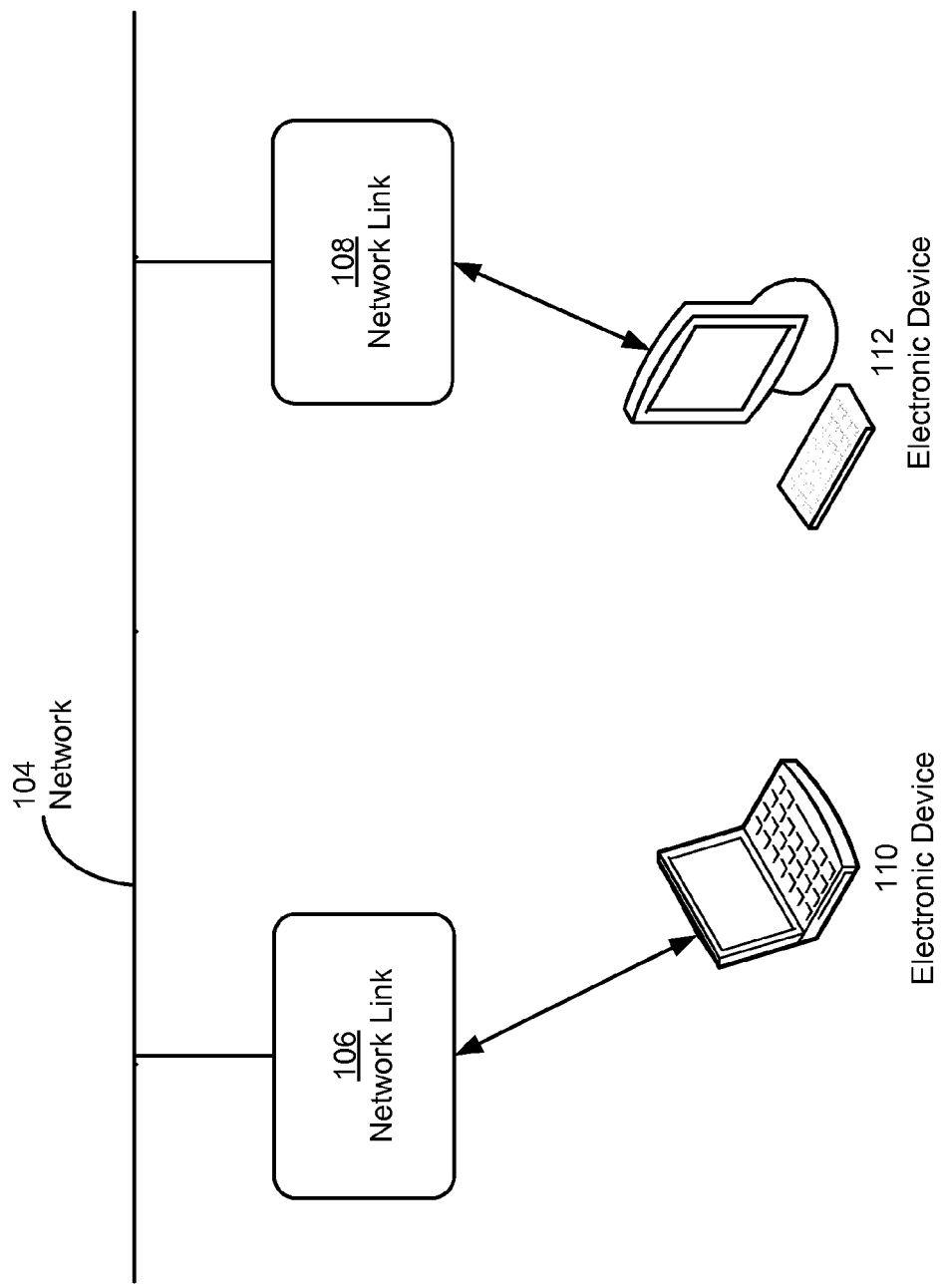
FIG. 1 shows a schematic of a system in accordance with the disclosed embodiments.

The disclosed embodiments provide a method and system for facilitating communication between electronic devices. As shown in FIG. 1, a number of electronic devices 110-112 are connected to a network 104 through network links 106-108 provided by devices such as wireless access points, cellular towers, and/or routers. Electronic devices 110-112 may correspond to personal computers, laptop computers, tablet computers, mobile phones, portable media players, digital media receivers, video game consoles, printers, scanners, and/or other network-enabled electronic devices. Network 104 may include a local area network (LAN), wide area network (WAN), personal area network (PAN), virtual private network, intranet, mobile phone network (e.g., a cellular network), WiFi network, Ethernet network, and/or other type of network with existing infrastructure (e.g., network links 106-108) that facilitates communication among electronic devices (e.g., electronic devices 110-112) connected to network 104.

Electronic devices 110-112 may communicate with one another and/or with other electronic devices or servers through network 104. For example, electronic device 110 may use a discovery protocol such as Bonjour (Bonjour™ is a registered trademark of Apple Inc.) to advertise services on electronic device 110 to electronic device 112 and/or other electronic devices on network 104. In turn, electronic device 112 may use the discovery protocol and network 104 to discover (e.g., detect) the services on electronic device 110. Finally, electronic device 112 may use the services by connecting to electronic device 110 through network 104 and accessing the services. For example, electronic device 112 may use the discovery protocol and network 104 to access services for transferring files, streaming media, printing, collaborating on documents, and/or sharing desktops on electronic device 110.

However, communication between electronic devices 110-112 may be limited by the availability, bandwidth, and/or capabilities of network links 106-108 and/or network 104. For example, each electronic device 110-112 may be unable to discover and/or use services on other electronic devices in the absence of a structured network (e.g., network 104) connecting the electronic device to the other electronic devices.

Figure 2:
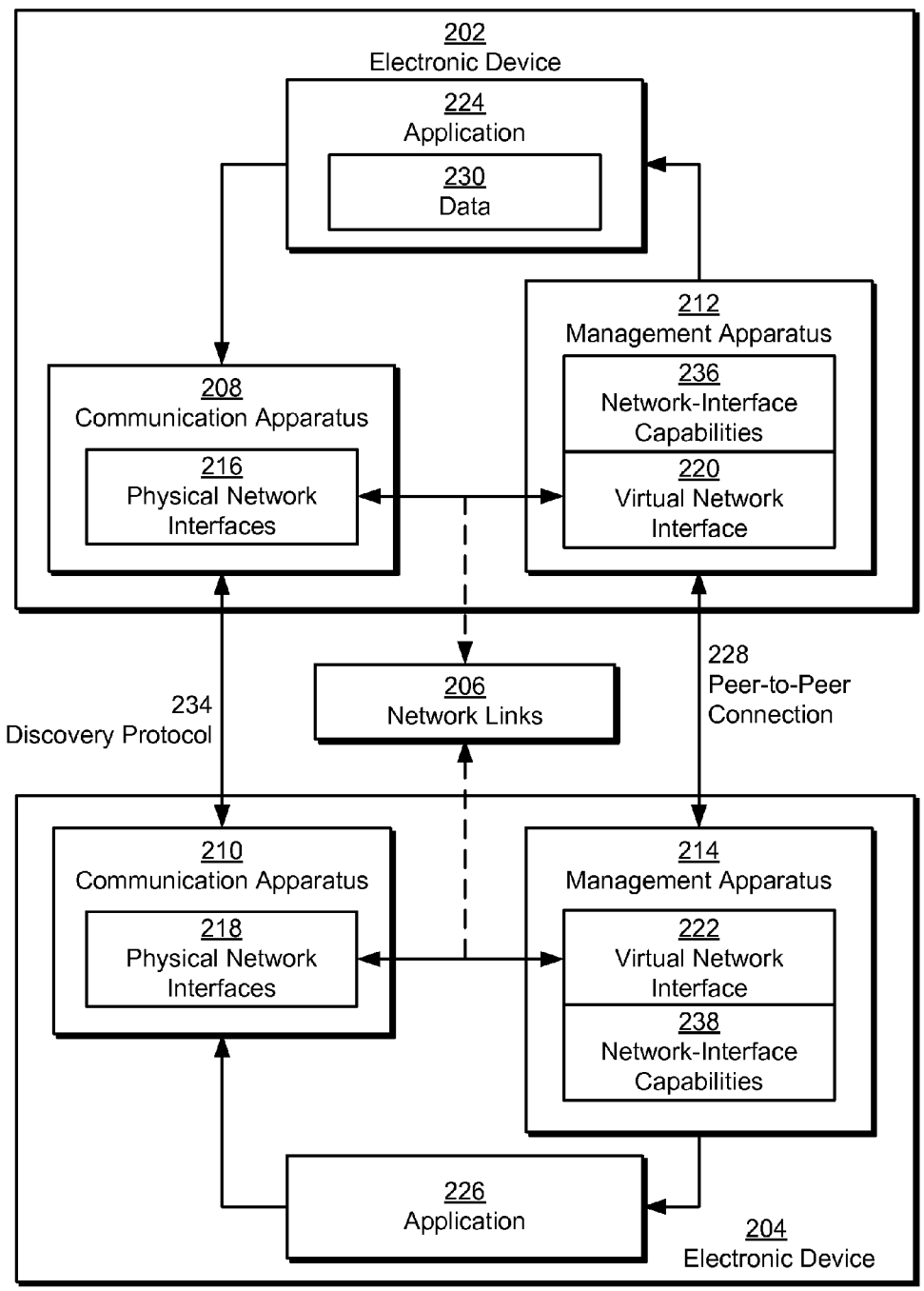
FIG. 2 shows a system for facilitating communication between a first electronic device and a second electronic device in accordance with the disclosed embodiments.

In one or more embodiments, electronic devices 110-112 include functionality to communicate with one another in the absence of network links 106-108 and/or other existing network infrastructure between electronic devices 110-112. As shown in FIG. 2, a set of electronic devices 202-204 may be connected through one or more network links 206 (e.g., access points, routers, cellular towers, etc.) of a structured network, such as network 102 of FIG. 1. Conversely, network links 206 may not be available (e.g., out of range, secured, etc.) to one or both electronic devices 202-204, and electronic devices 202-204 may be unable to connect to one another through the structured network.

To enable transfer of data 230 from an application 224 on electronic device 202 to an application 226 on electronic device 204 without communicating through network links 206 and/or other existing network infrastructure, electronic devices 202-204 may establish a peer-to-peer connection 228 with one another and transmit data 230 over peer-to-peer connection 228. For example, electronic devices 202-204 may use peer-to-peer connection 228 to transfer files, stream digital media, and/or synchronize game play among players in a multi-player game.

To enable creation of peer-to-peer connection 228, communication apparatuses 208-210 on electronic devices 202-204 may use a discovery protocol 234 such as Bonjour to enable discovery of electronic devices 202-204. For example, one or both applications 224-226 may advertise services on electronic devices 202-204 through Bonjour. In turn, electronic devices 202-204 may use Bonjour to discover the advertised services and obtain information that is used to establish peer-to-peer connection 228.

In one or more embodiments, use of discovery protocol 234 and peer-to-peer connection 228 is enabled through a set of physical network interfaces 216-218 on each electronic device 202-204. Physical network interfaces 216-218 may be used by electronic devices 202-204 to communicate with one another and/or with other network-enabled electronic devices. For example, physical network interfaces 216-218 may include Bluetooth (Bluetooth™ is a registered trademark of Bluetooth SIG, Inc.) interfaces, wireless (e.g., WiFi, WirelessHD (WirelessHD™ is a registered trademark of SiBEAM, Inc.)) interfaces, and/or Ethernet interfaces.

Those skilled in the art will appreciate that different physical network interfaces may be suited for different types of communication between electronic devices 202-204. For example, a low-power Bluetooth interface may facilitate efficient discovery of electronic devices 202-204, while a higher-bandwidth WiFi and/or WirelessHD interface may enable faster transfer of data between electronic devices 202-204. However, peer-to-peer connection 228 may be established and maintained over the same physical network interface during communication between electronic devices 202-204, regardless of the use of peer-to-peer connection 228 by applications 224-226 and/or the availability of other physical network interfaces on electronic devices 202-204.

In one or more embodiments, the system of FIG. 2 facilitates use of peer-to-peer connection 228 by adapting the physical network interface used by peer-to-peer connection 228 based on the availability and/or use of physical network interfaces 216-218 by peer-to-peer connection 228 and/or other network connections on electronic devices 202-204. To enable switching of peer-to-peer connection 228 among physical network interfaces 216-218, a virtual network interface 220-222 on each electronic device 202-204 may be used to aggregate physical network interfaces 216-218 on the electronic device.

Virtual network interfaces 220-222 may be abstract, virtualized, and/or software representations of network interfaces on electronic devices 202-204. Applications 224-226 may use virtual network interfaces 220-222 to transfer data over peer-to-peer connection 228 and may not be aware of the underlying physical network interfaces 216-218 on electronic devices 202-204. In other words, virtual network interfaces 220-222 may obscure physical network interfaces 216-218 from applications 224-226, thus enabling communication between applications 224-226 regardless of the mechanism(s) used to perform such communication.

For example, each virtual network interface 220-222 may reside between a network stack and physical network interfaces 216-218 of the corresponding electronic device 202-204. The virtual network interface and each physical network interface may be represented by a software interface in an operating system kernel of the electronic device. The virtual network interface may be assigned a layer-3 network (e.g., Internet Protocol (IP)) address, while physical network interfaces 216-218 may lack layer-3 addresses. Incoming packets from a physical network interface connected to the virtual network interface may be intercepted by the virtual network interface and passed up the network stack by the virtual network interface to the corresponding application (e.g., applications 224-226). Similarly, outgoing packets from the application and/or network stack may be received by the virtual network interface and forwarded to the physical network interfaces associated with the packets' destinations.

To route packets to the appropriate physical network interfaces, the virtual network interface may build a table of network addresses (e.g., layer 2 addresses) from packets received through each physical network interface managed by the virtual network interface. The virtual network interface may also inspect the destination address of each outgoing packet from the network stack. If the destination address is a broadcast or multicast address, the virtual network interface may pass the packet to every physical network interface attached to the virtual network interface for transmission over the physical network interface. If the destination address matches the network address of an entry in the table, the virtual network interface may pass the packet to a specific physical network interface associated with the network address for transmission over the physical network interface.

As mentioned above, discovery protocol 234 may be used to perform discovery of electronic devices 202-204. Communication apparatuses 208-210 may also use discovery protocol 234 to obtain network addresses, port numbers, and/or other information that is used to establish peer-to-peer connection 228 over a first physical network interface used to provide discovery protocol 234. Once peer-to-peer connection 228 is established, management apparatuses 212-214 in electronic devices 202-204 may enable data transfer over the first physical network interface by attaching the first physical network interface to virtual network interfaces 220-222.

Management apparatuses 212-214 may also negotiate a switch of peer-to-peer connection 228 from a first physical network interface to a second physical network interface. For example, management apparatuses 212-214 may enable a switch from a first physical network interface that is suitable for discovering electronic devices 202-204 (e.g., a Bluetooth interface) to a second physical network interface that is suitable for transferring large amounts of data 230 (e.g., a wireless or Ethernet interface) between electronic devices 202-204 after electronic devices 202-204 have discovered one another.

During negotiation of the switch in physical network interface used to provide peer-to-peer connection 228, management apparatuses 212-214 may exchange network-interface capabilities 236-238 of the corresponding electronic devices 202-204 with one another. For example, management apparatus 212 may use a side channel on peer-to-peer connection 228 to transmit network-interface capabilities 236 for electronic device 202 to management apparatus 214 and/or obtain network-interface capabilities 238 for electronic device 204 from management apparatus 214.

Management apparatuses 212-214 may then decide to switch peer-to-peer connection to a different physical network interface based on network-interface capabilities 236-238 and/or one or more characteristics associated with peer-to-peer connection 228. For example, management apparatuses 212-214 may select a physical network interface that is preferable for use by both electronic devices 202-204. Alternatively, one management apparatus 212-214 may act as a master that obtains network-interface capabilities 236-238 for both electronic devices 202-204 and/or characteristics associated with peer-to-peer connection 228 and chooses the physical network interface to be used with peer-to-peer connection 228 on behalf of both electronic devices 202-204.

Network-interface capabilities 236-238 may specify the capabilities associated with use of physical network interfaces 216-218 on electronic devices 202-204. For example, each set of network-interface capabilities 236-238 may include a type of physical network interface (e.g., Bluetooth, Ethernet, wireless, etc.) on the corresponding electronic device. The network-interface capabilities may also include one or more available channels and/or a current channel on the physical network interface. The network-interface capabilities may further specify an availability to switch channels (e.g., if the current channel is not being used for another purpose and/or by another application) or a lack of availability to switch channels (e.g., if the current channel is being used for another purpose and/or by another application). Finally, the network-interface capabilities may indicate a current network (e.g., infrastructure network) to which the physical network interface is connected and/or a reachable network address for the physical network interface on the current network.

Characteristics associated with peer-to-peer connection 228 may describe the current state and/or usage of peer-to-peer connection 228 by electronic devices 202-204. For example, the characteristics may include a buffer utilization associated with peer-to-peer connection 228 and/or an amount of network traffic (e.g., throughput, idleness, etc.) over peer-to-peer connection 228. The characteristics may also describe any congestion and/or contention between the network traffic and other network traffic on electronic devices 202-204 over the physical network interface used by peer-to-peer connection 228. Moreover, the characteristics may indicate the amount of data (e.g., data 230) transmitted over peer-to-peer connection 228, the power consumption associated with peer-to-peer connection 228, and/or the level of security (e.g., lack of hops in transmission of packets between electronic devices, encryption, etc.) associated with peer-to-peer connection 228. Finally, the characteristics may indicate and/or hint at the use of peer-to-peer connection 228 (e.g., to transfer data, synchronize game play, stream media, etc.) by electronic devices 202-204 (e.g., through requests for bandwidth, power consumption, security, and/or other characteristics of physical network interfaces 216-218 by applications 224-226).

During the decision to switch peer-to-peer connection 228, management apparatuses 212-214 may select a physical network interface that is available on both electronic devices 202-204 and/or suitable for use with applications 224-226. For example, management apparatuses 212-214 may keep peer-to-peer connection 228 on the original physical network interface used with discovery protocol 234 (e.g., Bluetooth interface) if peer-to-peer connection 228 is used to transmit small amounts of data and/or other physical network interfaces on electronic devices 202-204 are unavailable, congested, and/or under contention. On the other hand, management apparatuses 212-214 may switch peer-to-peer connection 228 to a higher-bandwidth physical network interface (e.g., Ethernet interface, wireless interface, etc.) if peer-to-peer connection 228 is used to transmit large amounts of data and/or a common channel on the higher-bandwidth physical network interface is available for use on both electronic devices 202-204.

If a decision to switch peer-to-peer connection 228 to a second physical network interface is made, each management apparatus 212-214 may perform the switch by attaching the second physical network interface to the corresponding virtual network interface 220-222 and detaching the first physical network interface from the virtual network interface. If the electronic device associated with the management apparatus has other peer-to-peer connections with other electronic devices, the management apparatus may continue attaching the virtual network interface to both physical network interfaces and route network traffic associated with peer-to-peer connection 228 over the second physical network interface.

For example, the electronic device may have peer-to-peer connections over a Bluetooth interface with four other electronic devices. After one of the peer-to-peer connections is switched to a WiFi interface, the management apparatus may update the table of network addresses so that the destination address of the other electronic device on the peer-to-peer connection is the network address of the other electronic device's WiFi interface instead of the network address of the other electronic device's Bluetooth interface. In turn, the management apparatus may begin routing network traffic to the other electronic device over the WiFi interface while continuing to route network traffic associated with the other three peer-to-peer connections over the Bluetooth interface.

Management apparatuses 212-214 may continue adapting use of peer-to-peer connection 228 with different physical network interfaces 216-218 based on changes to network-interface capabilities 236-238 and/or characteristics of peer-to-peer connection 228. For example, management apparatuses 212-214 may move peer-to-peer connection 228 from a wireless interface back to a lower-power Bluetooth interface if network traffic over peer-to-peer connection 228 drops below a pre-specified threshold, indicating a reduction and/or completion of data transfer between electronic devices 202-204. Conversely, management apparatuses 212-214 may move peer-to-peer connection from the wireless interface to an Ethernet interface if the wireless interface is experiencing a high level of contention and/or congestion and network traffic over peer-to-peer connection 228 has not dropped.

By switching peer-to-peer connection 228 among different physical network interfaces, the system of FIG. 2 may adapt peer-to-peer connection 228 to different uses of peer-to-peer connection and/or changes to the availability and/or use of physical network interfaces 216-218 on electronic devices 202-204. At the same time, the system of FIG. 2 may restrict different uses of peer-to-peer connection 228 (e.g., discovery, data transfer, etc.) to different physical network interfaces 216-218 to prevent interference associated with performing discovery and/or other tasks on multiple physical network interfaces. Consequently, the system of FIG. 2 may facilitate efficient use of physical network interfaces 216-218 with peer-to-peer connection 228 and/or other network connections on electronic devices 202-204.

Those skilled in the art will appreciate that the system of FIG. 2 may be implemented in a variety of ways. First, communication apparatuses 208-210 and management apparatuses 212-214 on each electronic device 202-204 may be provided by the same software and/or hardware component, or communication apparatuses 208-210 and management apparatuses 212-214 may execute independently from one another. For example communication apparatuses 208-210 and management apparatuses 212-214 may be implemented using different combinations of an application processor, a baseband processor, a multi-core processor, a single-core processor, an operating system kernel, a standalone application, a physical interface manager, and/or a driver.

Second, management apparatuses 212-214 may use a number of techniques to obtain network-interface capabilities 236-238 and/or characteristics of peer-to-peer connection 228. For example, management apparatuses 212-214 may obtain network-interface capabilities 236-238 as property lists, Extensible Markup language (XML) documents, JavaScript Object Notation (JSON) objects, and/or other types of structured and/or serialized data. Management apparatuses 212-214 may also obtain and/or identify characteristics of peer-to-peer connection 228 based on network traffic received through virtual network interfaces 220-222, information from the operating system kernels of electronic devices 202-204, and/or requests from applications 224-226 to virtual network interfaces 220-222 and/or discovery protocol 234 (e.g., for specific uses of peer-to-peer connection 228).

Figure 3:
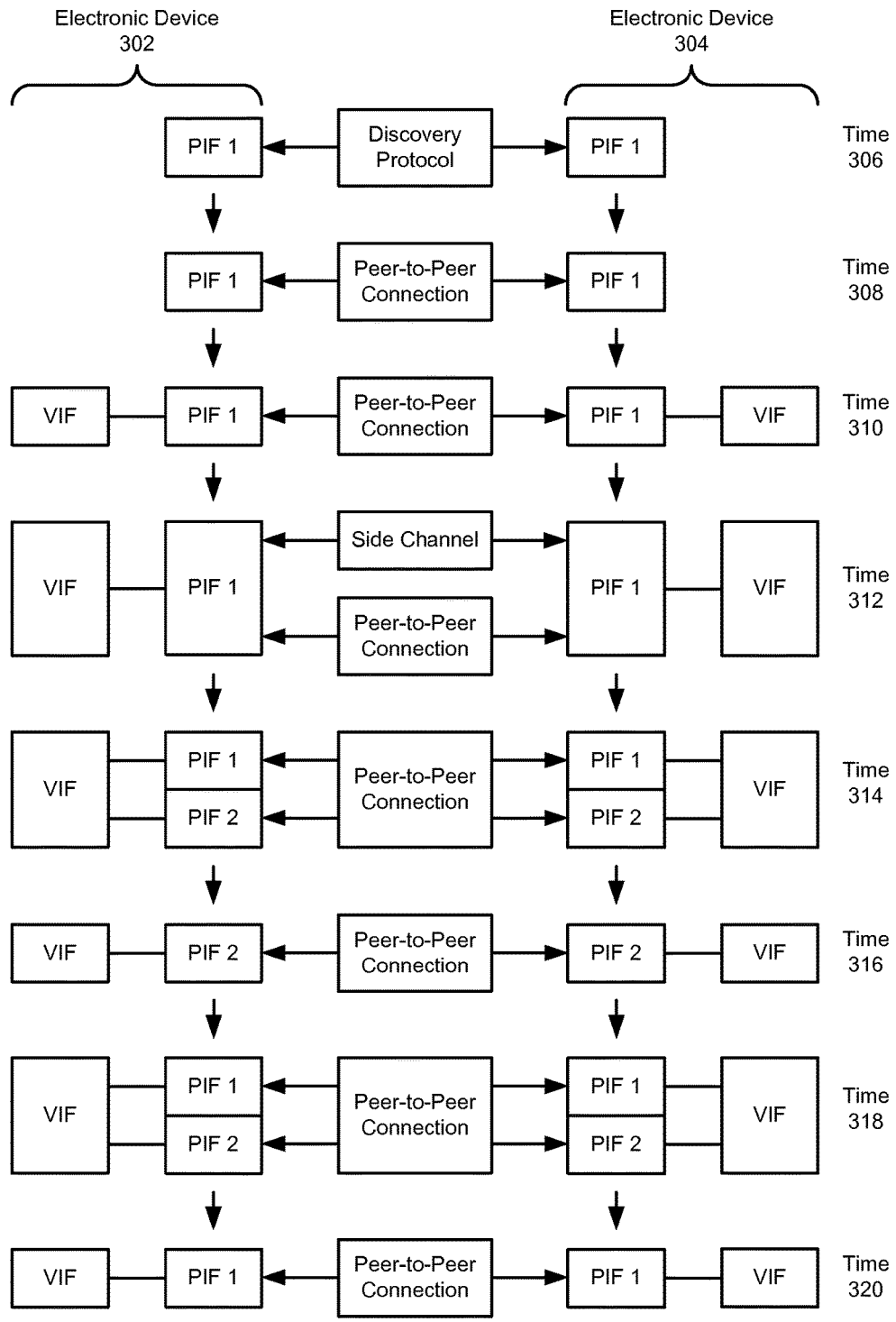
FIG. 3 shows an exemplary sequence of operations involved in switching a peer-to-peer connection between a set of physical network interfaces on a set of electronic devices in accordance with the disclosed embodiments.

FIG. 3 shows an exemplary sequence of operations involved in switching a peer-to-peer connection between a set of physical network interfaces on a set of electronic devices 302-304 in accordance with the disclosed embodiments. Beginning with time 306, electronic devices 302-304 may use a discovery protocol and a first physical network interface (e.g., "PIF 1") to discover one another. For example, electronic devices 302-304 may use Bonjour and a Bluetooth interface to advertise and/or discover services with one another.

At time 308, electronic devices 302-304 may establish a peer-to-peer connection over the first physical network interface (e.g., using information obtained using the discovery protocol). At time 310, the first physical network interface may be connected to a virtual network interface (e.g., "VIF") on each electronic device 302-304, thus enabling data transfer over the peer-to-peer connection. For example, the connection of the first physical network interface to the virtual network interface may allow applications on electronic devices 302-304 to transfer files, synchronize game play for a game, stream media, and/or otherwise communicate with one another.

At time 312, a side channel is established over the peer-to-peer connection by the virtual network interfaces. The side channel may be used by the virtual network interfaces to negotiate a switch of the peer-to-peer connection to a different physical network interface. For example, the side channel may be used by the virtual network interfaces to obtain and/or exchange network-interface capabilities for electronic devices 302-304. Electronic devices 302-304 may then use the network-interface capabilities and/or characteristics of the peer-to-peer connection to decide on a switch to another physical network interface.

At time 314, a second physical network interface (e.g., "PIF 2") is attached to the virtual network interface on each electronic device 302-304, and the peer-to-peer connection is established over both physical network interfaces. For example, the peer-to-peer connection may be established over the Bluetooth interface used to discover electronic devices 302-304 and a wireless interface to be used in transferring data between electronic devices 302-304. At time 316, the first physical network interface is detached from the virtual network interface, and the switch of the peer-to-peer connection to the second physical network interface is complete.

Use of the peer-to-peer connection over the second physical network interface (e.g., to transfer data) may continue until the network-interface capabilities and/or characteristics of the peer-to-peer connection change, prompting a decision to move the peer-to-peer connection back to the first physical network interface. For example, the decision to switch the peer-to-peer connection back to the first physical network interface may be made if network traffic over the peer-to-peer connection drops below a pre-specified threshold, the second physical network interface is associated with a high level of contention and/or congestion, and/or the first physical network interface is more suitable for the current use of peer-to-peer connection by electronic devices 302-304.

At time 318, the move back to the first physical network interface is initiated by attaching the first physical network interface to the virtual network interface and establishing the peer-to-peer connection over both physical network interfaces. Finally, at time 320, the move back to the first physical network interface is completed by detaching the second physical network interface from the virtual network interface. The peer-to-peer connection may then be maintained on the second physical network interface (e.g., to enable subsequent communication between electronic devices 302-304) and/or terminated (e.g., after communication between electronic devices 302-304 has completed).

Figure 4:
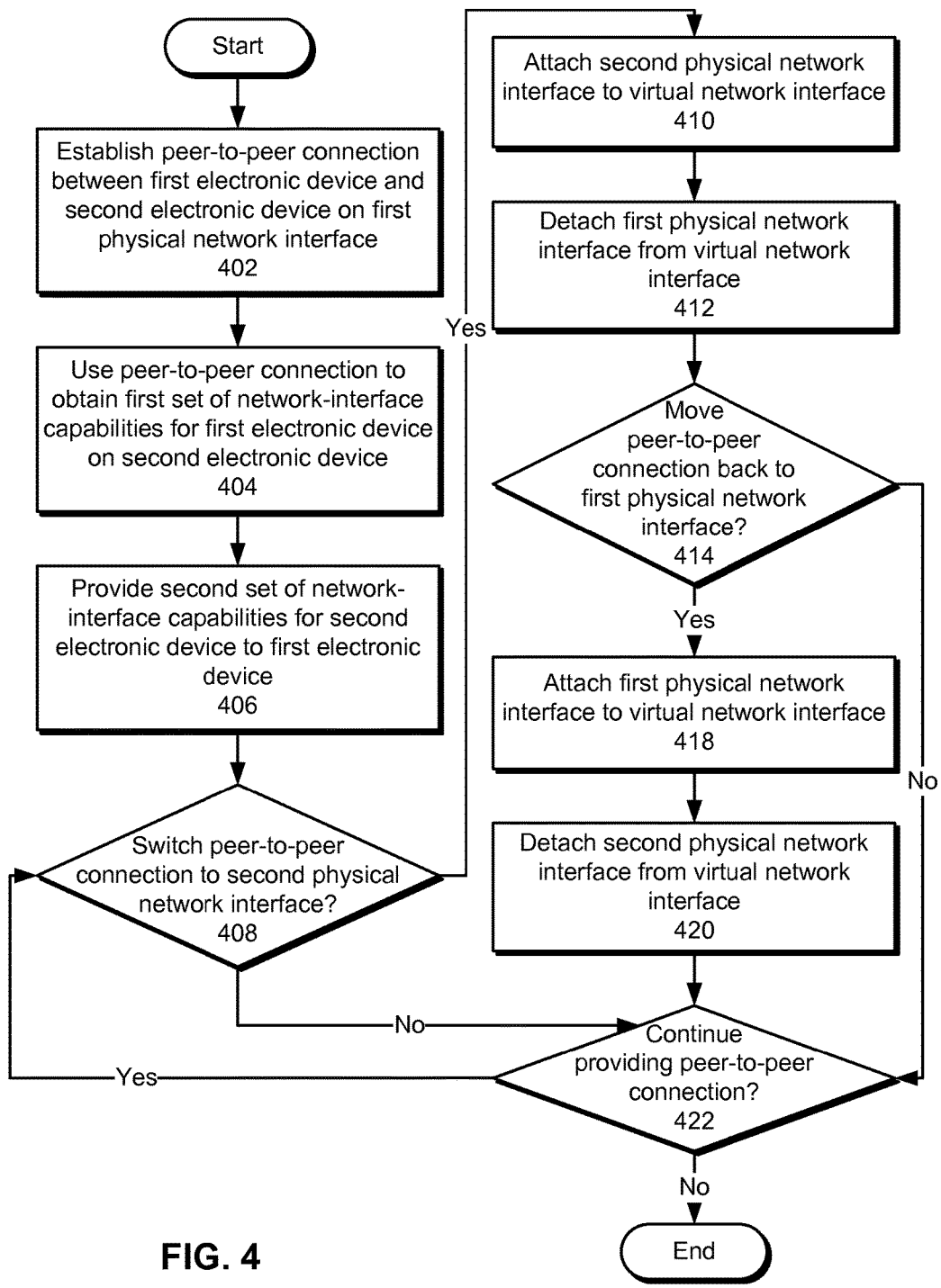
FIG. 4 shows a flowchart illustrating the process of facilitating communication with a first electronic device from a second electronic device in accordance with the disclosed embodiments.

FIG. 4 shows a flowchart illustrating the process of facilitating communication with a first electronic device from a second electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a peer-to-peer connection between the first electronic device and the second electronic device is established on a first physical network interface (operation 402). To establish the peer-to-peer connection, a discovery protocol such as Bonjour may be used to enable discovery of the first or second electronic devices on the first physical network interface. Next, the peer-to-peer connection may be established over the first physical network interface, and data transfer over the first physical network interface may be enabled by attaching the first physical network interface to a virtual network interface on the first and second electronic devices.

The peer-to-peer connection is used to obtain a first set of network-interface capabilities for the first electronic device on the second electronic device (operation 404), and optionally to provide a second set of network-interface capabilities for the second electronic device to the first electronic device (operation 406). The network-interface capabilities may include a type of physical network interface, one or more available channels, a current channel, an availability to switch channels, a current network, and/or a reachable network address for a physical network interface on the corresponding electronic device.

The peer-to-peer connection may be switched to a second physical network interface (operation 408) based on the network-interface capabilities and/or one or more characteristics associated with the peer-to-peer connection. The characteristics associated with the peer-to-peer connection may include a buffer utilization, an amount of network traffic, contention between the network traffic and other network traffic, a use of the peer-to-peer connection by the first and second electronic devices, an amount of data transmitted, a power consumption, and/or a level of security associated with the peer-to-peer connection. The decision to switch the peer-to-peer connection may be made by one electronic device and communicated to the other electronic device, or both electronic devices may "negotiate" the switch with one another (e.g., by selecting a physical network interface that is suitable for use with the peer-to-peer connection for both electronic devices). If the peer-to-peer connection is not to be switched, communication between the electronic devices may continue over the first physical network interface.

If the decision to switch to the second physical network interface is made, the second physical network interface is attached to the virtual network interface (operation 410), and the first physical network interface is detached from the virtual network interface (operation 412). Alternatively, both physical network interfaces may be attached to the virtual network interface if the first physical network interface is used for other purposes, and network traffic over the peer-to-peer connection may be routed to the second physical network interface by the virtual network interface.

The peer-to-peer connection may also be moved back to the first physical network interface (operation 414) based on updates to the network-interface capabilities and/or characteristics of the peer-to-peer connection. For example, the peer-to-peer connection may be moved back to the first physical network interface to save power and/or reduce contention on the second physical network interface. If the peer-to-peer connection is not to be moved back to the first physical network interface, communication between the electronic devices may continue over the second physical network interface.

If the peer-to-peer connection is to be moved back to the first physical network interface, the first physical network interface is attached to the virtual network interface (operation 418), and the second physical network interface is detached from the virtual network interface (operation 420). If the second physical network interface is used for other purposes (e.g., by other applications), both physical network interfaces may remain attached to the virtual network interface, and the virtual network interface may route network traffic associated with the peer-to-peer connection over the first physical network interface.

The peer-to-peer connection may continue to be provided (operation 422) during use of the peer-to-peer connection by the electronic devices. If the peer-to-peer connection is to be provided, the peer-to-peer connection may be moved between the first and second physical network interfaces (operations 408-420) to adapt to changes in use of the peer-to-peer connection and/or the network-interface capabilities of the electronic devices. Such switching of the peer-to-peer connection among physical network interfaces may continue until the peer-to-peer connection is no longer used by the electronic devices and/or the electronic devices are no longer within range of one another or capable of communicating with one another.

Figure 5:
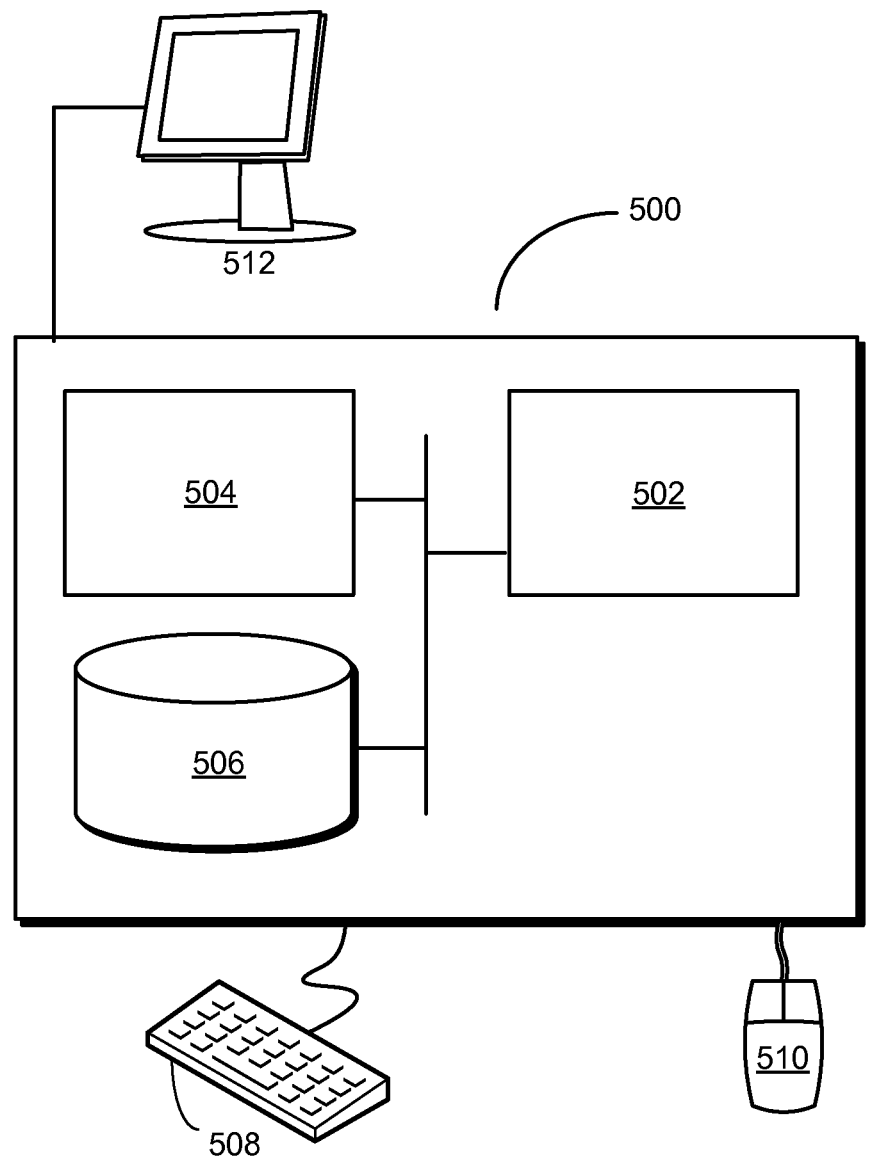
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating communication between a first electronic device and a second electronic device. The system may include a communication apparatus that establishes a peer-to-peer connection between the first electronic device and the second electronic device on a first physical network interface. The system may also include a management apparatus that uses the peer-to-peer connection to obtain, on the second electronic device, a first set of network-interface capabilities for the first electronic device. The management apparatus may also provide a second set of network-interface capabilities for the second electronic device to the first electronic device. Next, the management apparatus may switch the peer-to-peer connection to a second physical network interface based on one or both sets of network-interface capabilities and/or one or more characteristics associated with the peer-to-peer connection. Finally, the management apparatus may move the peer-to-peer connection back to the first physical network interface based on updates to the characteristics associated with the peer-to-peer connection.

In addition, one or more components of computer system 500 may be remotely located and connected to the other components over a network. Portions of the present embodiments (e.g., communication apparatus, management apparatus, electronic devices, etc.) may also be located on different nodes of a distributed system that implements the embodiments. For example, the present embodiments may be implemented using a number of electronic devices connected to one another through a set of physical network interfaces and/or virtual network interfaces.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating communication, comprising:
   establishing a peer-to-peer connection with a remote electronic device using a first physical network interface without communicating with the remote electronic device through an infrastructure network;
   connecting the first physical network interface to a virtual network interface;
   receiving a set of network-interface capabilities from the remote electronic device using the peer-to-peer connection; and
   switching the peer-to-peer connection from the first physical network interface to a second physical network interface based on at least one of the set of network-interface capabilities and one or more characteristics associated with the peer-to-peer connection, wherein the switching comprises connecting the second physical network interface to the virtual network interface.

2. The computer-implemented method of claim 1, further comprising transmitting a second set of network-interface capabilities to the remote electronic device.

3. The computer-implemented method of claim 1, further comprising moving the peer-to-peer connection back to the first physical network interface based on updates to at least one of the first set of network-interface capabilities, the second set of network interface capabilities, and the one or more characteristics.

4. The computer-implemented method of claim 1, wherein establishing the peer-to-peer connection comprises:
   using a discovery protocol to enable discovery of the remote electronic device on the first physical network interface;
   establishing the peer-to-peer connection over the first physical network interface; and
   enabling data transfer over the first physical network interface.

5. The computer-implemented method of claim 1, wherein switching the peer-to-peer connection further comprises detaching the first physical network interface from the virtual network interface.

6. The computer-implemented method of claim 1, further comprising:
   establishing, using the virtual network interface, a side channel over the peer-to-peer connection; and
   transmitting a second set of network-interface capabilities using the side channel to the remote electronic device.

7. The computer-implemented method of claim 1, wherein the one or more characteristics associated with the peer-to-peer connection comprise at least one of:
   a buffer utilization associated with the peer-to-peer connection;
   an amount of network traffic over the peer-to-peer connection;

contention between the network traffic and other network traffic on the first or second electronic devices;

a use of the peer-to-peer connection by the first and second electronic devices;

an amount of data transmitted over the peer-to-peer connection;

a power consumption associated with the peer-to-peer connection; and a level of security associated with the peer-to-peer connection.

8. The computer-implemented method of claim 1, wherein the first set of network-interface capabilities comprises at least one of:

a type of physical network interface;
one or more available channels;
a current channel;
an availability to switch channels;
a current network; and
a reachable network address.

9. The computer-implemented method of claim 1, wherein the virtual network interface is configured to use the first network interface for traffic for the peer-to-peer connection.

10. The computer-implemented method of claim 1, further comprising communicating using the peer-to-peer connection using the second physical network interface without communicating through the infrastructure network.

11. The computer-implemented method of claim 1, wherein switching the peer-to-peer connection is also based on a local set of network-interface capabilities.

12. The computer-implemented method of claim 1, further comprising:

updating a table of network addresses so that a destination address of the remote electronic device on the peer-to-peer connection comprises a network address of a physical network interface of the remote electronic device that corresponds to the second physical network interface, wherein the table of network addresses is used for determining the second physical network interface for transmitting a packet to the remote electronic device.

13. A system for facilitating communication, comprising:

a communication apparatus configured to establish a peer-to-peer connection with a remote electronic device using a first physical network interface without communicating with the remote electronic device through an infrastructure network; and a management apparatus configured to:

connect the first physical network interface to a virtual network interface;

receive a set of network-interface capabilities from the remote device using the peer-to-peer connection; and switch the peer-to-peer connection to a second physical network interface based on the set of network-interface capabilities and one or more characteristics associated with the peer-to-peer connection, so that the second physical interface is used for the peer-to-peer connection instead of the first physical interface, the switching comprising connecting the second physical network interface to the virtual network interface so that the virtual network interface uses the second physical network interface.

14. The system of claim 13, wherein the management apparatus is further configured to transmit a second set of network-interface capabilities to the remote electronic device.

15. The system of claim 13, wherein the management apparatus is further configured to move the peer-to-peer connection back to the first physical network interface based on updates to at least one of the first set of network-interface capabilities, the second set of network-interface capabilities, and the one or more characteristics.

16. The system of claim 13, wherein the communication apparatus is further configured to:

use a discovery protocol to enable discovery of the remote electronic device on the first physical network interface;

establish the peer-to-peer connection over the first physical network interface; and enable data transfer over the first physical network interface.

17. The system of claim 13, wherein the management apparatus is further configured to detach the first physical network interface from the virtual network interface.

18. The system of claim 13, wherein the management apparatus is further configured to:

establish, using the virtual network interface, a side channel over the peer-to-peer connection; and transmit a second set of network-interface capabilities using the side channel to the remote electronic device.

19. The system of claim 13, wherein the virtual network interface resides between a local network stack and the first and second physical network interfaces.

20. A computer-readable storage medium storing instructions that when executed by a computer cause the computer to perform operations for facilitating communication, the operations comprising:

establishing a peer-to-peer connection with a remote electronic device using a first physical network interface without communicating with the remote electronic device through an infrastructure network;

connecting the first physical network to a virtual network interface;

receiving a set of network-interface capabilities from the remote electronic device using the peer-to-peer connection; and switching the peer-to-peer connection from the first physical network interface to a second physical network interface based on the set of network-interface capabilities and one or more characteristics associated with the peer-to-peer connection, the switching comprising connecting the second physical network interface to the virtual network interface so that the virtual network interface uses the second physical network interface.

21. The computer-readable storage medium of claim 20, wherein the operations further comprise at least one of:

transmitting a second set of network-interface capabilities to the remote electronic device; and further switching the peer-to-peer connection to the second physical network interface based on the second set of network-interface capabilities.

22. The computer-readable storage medium of claim 20, wherein the operations further comprise:

moving the peer-to-peer connection back to the first physical network interface based on updates to at least one of the first set of network-interface capabilities, the second set of network-interface capabilities, and the one or more characteristics.

23. The computer-readable storage medium of claim 20, wherein establishing the peer-to-peer connection comprises:

using a discovery protocol to enable discovery of the remote electronic device on the first physical network interface;

establishing the peer-to-peer connection over the first physical network interface; and enabling data transfer over the first physical network interface.

24. The computer-readable storage medium of claim 20, wherein the operations further comprise establishing, using the virtual network interface, a side channel over the peer-to-peer connection.

25. The computer-readable storage medium of claim 24, wherein the operations further comprise transmitting a second set of network-interface capabilities using the side channel to the remote electronic device.

26. The computer-readable storage medium of claim 20, wherein the one or more characteristics associated with the peer-to-peer connection comprise at least one of:

a buffer utilization associated with the peer-to-peer connection;

an amount of network traffic over the peer-to-peer connection;

contention between the network traffic and other network traffic on the first or second electronic devices;

a use of the peer-to-peer connection by the first and second electronic devices;

an amount of data transmitted over the peer-to-peer connection;

a power consumption associated with the peer-to-peer connection; and a level of security associated with the peer-to-peer connection.

27. The computer-readable storage medium of claim 20, wherein the switching comprises using the second physical network interface for communication with the remote electronic device.

* * * * *